Aug. 28, 1923.

P. M. IKELER ET AL 1,466,556

SEED COLLECTING DEVICE

Filed April 17, 1922

P. M. IKELER ET AL 1,466,556

SEED COLLECTING DEVICE

Filed April 17, 1922

INVENTORS
P. M. Ikeler and
H. D. McDonald
BY James J. Heeley
ATTORNEYS

Patented Aug. 28, 1923.

1,466,556

UNITED STATES PATENT OFFICE.

PHILIP M. IKELER AND HERBERT D. McDONALD, OF MOSELLE, MISSISSIPPI.

SEED-COLLECTING DEVICE.

Application filed April 17, 1922. Serial No. 553,486.

*To all whom it may concern:*

Be it known that we, PHILIP M. IKELER and HERBERT D. McDONALD, citizens of the United States, residing at Moselle, in the county of Jones and State of Mississippi, have invented new and useful Improvements in Seed-Collecting Devices, of which the following is a specification.

Our present invention pertains to agricultural implements, and it contemplates the provision of a device to be used in connection with a mower machine through the medium of which clover seed and the like may be quickly and easily collected and saved during the mowing operation and harvesting of said seed.

The invention further contemplates the provision of a device that will require the expenditure of no more labor than is necessary for the ordinary harvesting operation and one that will safely collect and store the seed.

The invention in all of its details will be fully understood from the following description and claims when the same are read in connection with the drawings accompanying and forming part of this specification in which:—

Similar numerals of reference designate corresponding parts in all the views of the drawings.

Figure 1:
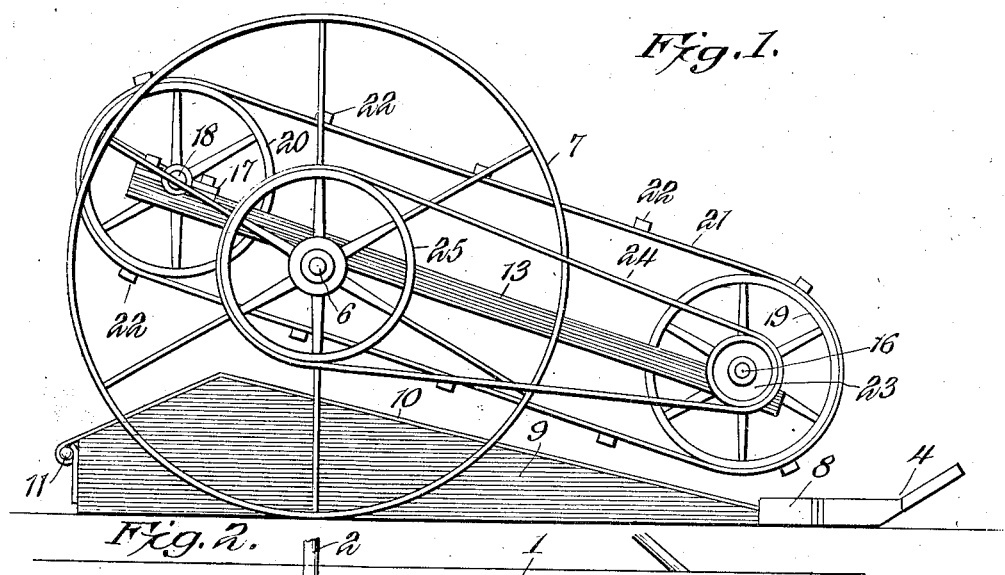
Figure 1 is a side elevation of our device.
Figure 2:
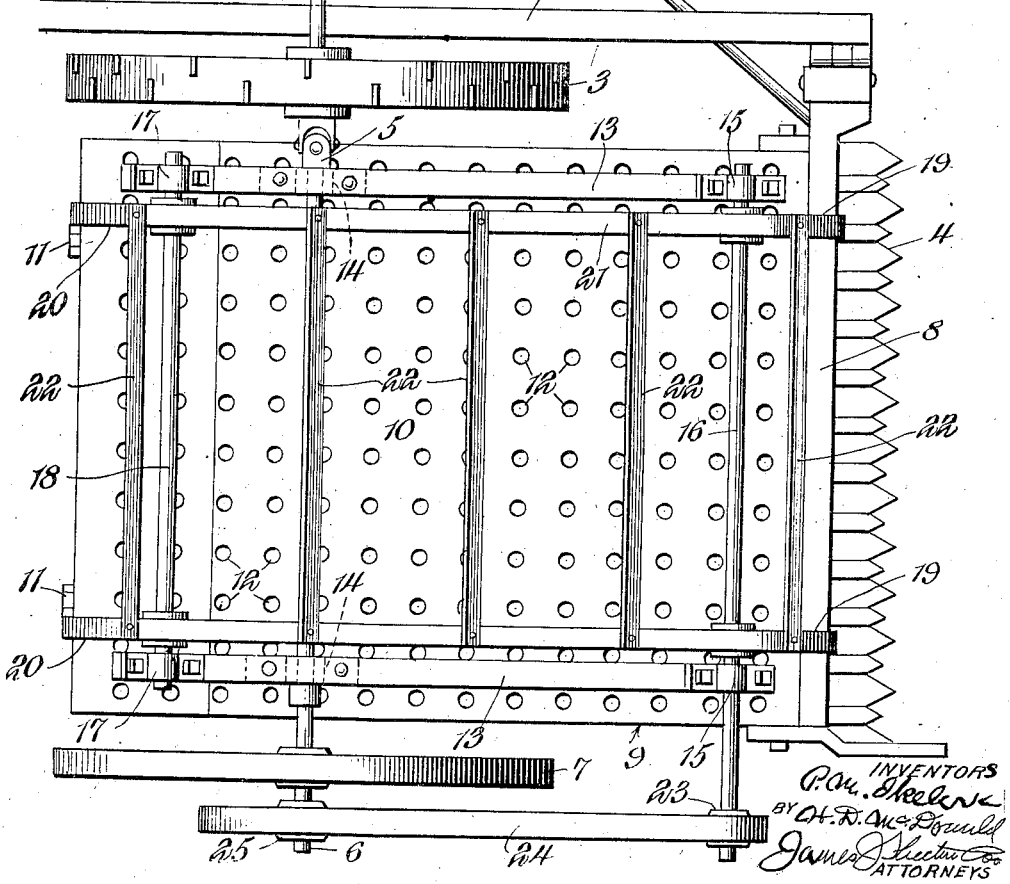
Figure 2 is a top plan view thereof.
Figure 3:
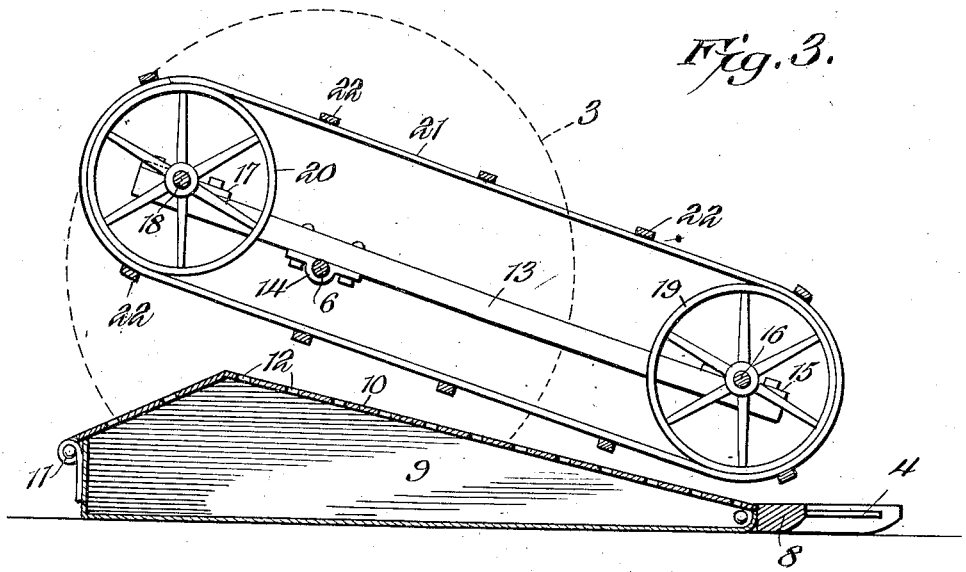
Figure 3 is a longitudinal section taken near the left hand side of the machine.

Our present device is secured to one side frame bar 1 of a mowing machine, which bar is arranged below the axle 2 and extends forwardly beyond the ground gripping wheel 3 on said axle 2 as shown in Figure 2, and our improvements are connected to the axle shaft 2 by means of a universal joint 5 and at the forward end of our device we provide the cutter bar or teeth 4 that are adapted to be directed at various angles with respect to the ground. The axle 6 is secured to the inclined frame 13 of our improvements by means of the connections 14 and near its free end the axle 6 is provided with a traction wheel 7 and on its extreme end with a pulley or wheel 25. This wheel 25 is splined on axle 6 and during rotation of wheel 7 rotary motion will be imparted to wheel 25 thereby.

Mounted and secured to the forward end of the inclined bars 13 by means of connections 15 is an axle 16 and mounted on this axle is a pulley 19 and on its extreme outer end the axle 16 is provided with the small pulley 23 and a belt 24 imparts power from the pulley 25 to pulley 23 and said power is in turn imparted to pulley 19 on axle 16.

Figure 4:
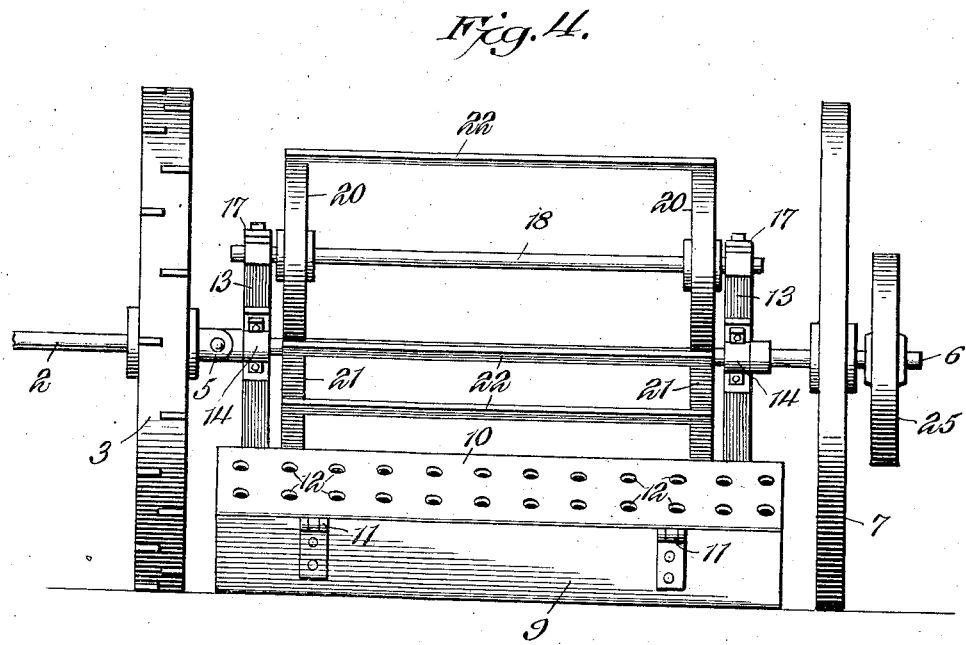
Figure 4 is a rear elevation of our invention.

Mounted in a similar manner on the bars 13 at the rear end of the machine through connections 17 is an axle 18 bearing the pulley 20 over which travels the belt 21 having the slats 22 equi-distantly arranged thereon. This belt 21 imparts motion to the pulley 20 from pulley 19. By reference to Figure 4 it will be seen that the bars 13, pulleys 19 and 20 are arranged on both sides of the machine and that the belt 21 and slats or cleats 22 extend practically the full width of the machine.

At the underside and beneath the belt 21 we arrange a seed receiving box 9 having a lid 10 that is hinged at 11 and is also foraminous as indicated by 12.

At its forward end the box 9 is provided with the open pan 8 upon which the seeds fall from the cutting blade 4.

In the practical use of the invention, the mower with our improvements attached is driven over a field and the blade 4 will cut the clover seed or the like. The seed will naturally fall into pan 8 and the cleats 22 of belt 21 will force the cuttings over the lid 10 of box 9. Manifestly the seed will drop through the openings 12 of lid 10 where they may be safely stored during the mowing operation.

The belt 21 will derive motion through pulleys 19 and 20 of shafts 16 and 18 which shafts in turn derive power from pulleys 23 and 25 on axles 16 and 6 respectively.

It will be manifest that movement of the mower will actuate the axle 6 at time of cutting of the clover or the like, and cause the various pulleys to move the belt 21 and thus draw the seed into the box 9 and hence automatically cut the ripe seed and store same in the box 9. The clover itself however, will fall from the cover of the box to the ground to be cured or dried.

It will be further manifest from the foregoing that the device is simple in construction and operation and may be readily and easily attached to a mowing machine and will require no more labor than that at present used for mowing operations.

Having described our invention, what we claim and desire to secure by Letters-Patent is:—

1. In a device for automatically gathering and storing seeds, or the like, the combination of a mowing machine, a shaft secured by a universal joint to the axle of the mowing machine, bars depending forwardly from the shaft, a traction wheel arranged on one end of the shaft, a pulley splined to the shaft, shafts arranged near the forward and rear end of the bars, pulleys arranged on the last named shafts, an endless belt having cleats thereon and passed around the pulleys, a comparatively small pulley arranged on one of the last-named shafts, a belt passing on the small pulley and also over the pulley of the first named shaft, cutting bars arranged below and in advance of all of the pulleys, a pan adapted to receive seed from the cutting bars, and a box arranged in rear of the pan and having a foraminous upper wall, substantially as and for the purpose set forth.

2. In a device for the purpose set forth, the combination with the axle and frame of a vehicle, a shaft secured by a universal joint to said axle, bars inclined from the shaft, a traction wheel splined to the shaft, a pulley arranged on the shaft, shafts connected to the bars, pulleys arranged on each end of the last named shafts, a belt having cleats thereon extending from one to the other of said pulleys, a small pulley mounted on one of the last named shafts, a belt for imparting motion from the first named shaft to the small pulley and a box arranged below the second named shafts and having a foraminous top therein.

In testimony whereof we have hereunto set our hands in presence of two subscribing witnesses.

PHILIP M. IKELER.
HERBERT D. McDONALD.

Witnesses:
 WM. M. WILLIAMS,
 D. W. HUTCHINS.